United States Patent [19]

Boucher

[11] 4,318,962

[45] Mar. 9, 1982

[54] METALLIZED MOLDED REFLECTOR FOR A VEHICLE HEADLAMP OR FOG LAMP

[75] Inventor: David G. Boucher, Wolverhampton, England

[73] Assignee: Lucas Industries Limited, Birmingham, England

[21] Appl. No.: 99,884

[22] Filed: Dec. 3, 1979

[30] Foreign Application Priority Data

Dec. 12, 1978 [GB] United Kingdom ............ 48200/78

[51] Int. Cl.³ ............................................ B32B 15/08
[52] U.S. Cl. .................................. 428/458; 428/31; 428/480; 428/482; 264/129; 264/328.1; 264/513; 525/25; 427/304
[58] Field of Search ............... 428/458, 480, 482, 31; 427/90, 91, 304; 525/25; 264/DIG. 83, 328, 513

[56] References Cited

U.S. PATENT DOCUMENTS

| 3,396,639 | 8/1968 | Lemelson | 428/31 X |
|---|---|---|---|
| 3,776,805 | 12/1973 | Hansen | 428/458 |
| 3,931,143 | 1/1976 | Macleay et al. | 525/25 X |
| 3,949,134 | 4/1976 | Willdorf | 428/458 |
| 3,956,269 | 5/1976 | Sheppard et al. | 525/25 X |
| 4,031,281 | 6/1977 | Keeling | 428/458 |
| 4,048,365 | 9/1977 | Hoover | 428/480 X |
| 4,048,423 | 9/1977 | Macleay et al. | 525/25 X |
| 4,132,822 | 1/1979 | Wismer et al. | 428/482 X |
| 4,148,967 | 4/1979 | Satoh et al. | 428/458 X |
| 4,172,178 | 10/1979 | Gainer et al. | 428/458 |
| 4,177,310 | 12/1979 | Steeves | 428/458 |

FOREIGN PATENT DOCUMENTS 1421752 1/1976 United Kingdom .

*Primary Examiner*—P. Ives
*Attorney, Agent, or Firm*—Trexler, Bushnell & Wolters, Ltd.

[57] ABSTRACT

A metallized, moulded article, particularly for use as a reflector for a motor vehicle lamp, is formed from a cured, unsaturated polyester resin based thermosetting moulding composition containing, as a curing initiator, an azo compound capable of forming free radicals at the moulding temperature.

5 Claims, No Drawings

METALLIZED MOLDED REFLECTOR FOR A VEHICLE HEADLAMP OR FOG LAMP

This invention relates to metallised moulded articles and particularly, but not exclusively, to moulded lamp reflectors for use in motor vehicle headlamps and fog lamps.

It is known from, for example, British Patent No. 1421752 to produce metallised moulded articles from unsaturated polyester resin based thermosetting moulding compositions and in this way it is possible to obtain hard infusible articles of accurately controlled shape. However, it is found that when the resultant metallised articles are employed in environments where relatively high temperatures (in excess of 120° C.) are experienced, such as motor vehicle headlamps and fog lamps, volatile organic compounds present in the moulding compositions are emitted from the articles. These organic compounds then condense on the cooler areas of the metallised surfaces of the articles to produce fogging which, in the case of a lamp reflector, is particularly detrimental to the performance of the reflector.

As a result of experimentation, it has now been found that one cause of the fogging experienced in metallised moulded articles produced from conventional unsaturated polyester resin based thermosetting moulding compositions is the presence of an organic peroxy compound to initiate curing of the composition. Moreover, although there are a variety of curing initiators which could be used to replace these organic peroxy compounds, further investigation has shown that selection of an azo compound initiator results in a significant reduction in the problem of fogging.

Accordingly, the invention resides in one aspect in a metallised, moulded article formed from a cured, unsaturated polyester resin based thermosetting moulding composition containing, as a curing initiator, an azo compound capable of forming free radicals at the moulding temperature.

In a further aspect, the invention resides in a method of producing a metallised, moulded article comprising the steps of moulding the article under the action of heat and pressure from an unsaturated polyester resin based thermosetting moulding composition, the composition containing an azo compound which is capable of forming free radicals at the moulding temperature and which initiates curing of the moulded composition, and subsequently subjecting the moulded article to a metallisation process.

Preferably the moulded article is a lamp reflector and the metallisation defines a reflective coating on an internal surface of the reflector.

The moulding composition employed in the present invention contains an unsaturated polyester dispersed in a copolymerizable unsaturated vinyl monomer and, in the presence of a free radical initiator, can be fabricated into hard infusible shaped articles by the action of heat and pressure. Examples of such compositions are sheet moulding compositions (SMC) and, more preferably, dough moulding compounds (DMC).

The unsaturated polyesters employed in the moulding compositions used in the present invention preferably have a high hot rigidity upon curing and a high proportion of maleic or fumaric unsaturation. Thus one example of a preferred polyester is polypropylene glycol maleate. Alternative polyesters include those in which maleic or fumaric residues have been partially replaced by orthophthalic, isophthalic or carbic residues or by chloro-acid residues, for example tetrachlorophthalic or chlorendic acid residues. In addition, it is possible to employ unsaturated polyesters containing a high proportion of maleic and fumaric residues and the Bisphenol A adducts of ethylene oxide or propylene oxide.

Preferably, the copolymerizable monomer is a liquid monomer having ethylenic unsaturation, such as styrene, vinyl toluene and diallylphthalate, although solid copolymerizable monomers, such as triallyl cyanurate, can also be employed. The copolymerizable monomer is normally employed in an amount between 10 and 60% by weight, or more preferably 20 to 50% by weight, of the total weight of the unsaturated polyester and copolymerizable monomer. The unsaturated polyester and the copolymerizable monomer conveniently comprise between 20 and 35% by weight of the entire moulding composition. The moulding composition also contains an azo compound capable of forming free radicals at the moulding temperature and of acting as the initiating agent for the polymerization and cross-linking of the polyester and copolymerizable monomer. Examples of suitable azo compounds are:

Genitron AZDN (2,2'-azobisisobutyronitrile)
Luazo 55 (2-t-butylazo-2-cyano-4-methoxy-4-methylpentane)
Luazo 79 (2-t-butylazo-2-cyanopropane)
Luazo 82 (2-t-butylazo-2-cyanobutane)
Luazo 94 (1-t-amylazo-1-cyanocyclohexane)
Luazo 96 (2-t-butylazo-1-cyanocylohexane)
Luazo 122 (2-t-butylazo-2,4-dimethoxy-4-methylpentane)

Genitron is a trade name of Fison Industrial Chemicals Limited and Luazo is a trade name of the Pennwalt Corporation. Preferably, the azo compound is present in an amount between 0.01% and 0.5% by weight of the total weight of the mouldisng composition.

As is explained in detail below, moulded articles produced in accordance with the invention, using an azo curing initiator, and after coating with a base lacquer and subsequent vacuum metallisation, are found to exhibit surprisingly low emission of detrimental volatile materials when subjected to operated temperatures as high as 150°–180° C. By way of contrast, using a conventional peroxide curing initiator, it is found that condensation of volatile organic materials causes fogging of the metallised surface when local temperatures within the moulded article exceed 120° C.

The moulding composition may also contain a fibrous reinforcing filler such as glass fibres (which are preferably surface treated to improve their adhesion) and synthetic fibres, such as Terylene (Registered Trade Mark) and polyvinyl alcohol. The amount of fibrous reinforcement employed depends on the strength required in the final moulding, but generally is between 10 and 35% by weight of the total moulding composition. The fibre reinforcement may be in the form of a mat or a web, or in the form of chopped strands or rovings or in the form of fibres which have been milled or ground.

Inorganic fillers may also be present in the moulding composition in amounts up to 80%, or more preferably up to 65%, by weight of the total moulding composition. Suitable inorganic fillers include alumina, calcium carbonate, dolomite, silicates and mixtures thereof. In addition, active filler materials such as viscosity modifiers (e.g. calcium and magnesium oxides and hydroxides)

and fire retarding agents (e.g. antimony oxide) can be present.

Conveniently, part of the inorganic filler is replaced by a modifier for controlling mould shrinkage. Suitable modifiers include thermoplastic polymers such as polyvinyl chloride, polyethylene, polystyrene, polyacrylates and polymethacrylates. Such modifiers can be added in amounts up to 15% by weight of the total composition to yield a so-called "low shrink" moulding composition. Alternatively, the modifier may comprise a combination of a thermoplastic polymer, such as polyvinyl chloride, polyethylene and polystyrene, and a saturated liquid polyester, such as polypropylene adipate or sebacate. With such a combined modifier system, it is possible to obtain zero mould shrinkage or even an apparent expansion and hence such compositions are known as "non-shrink" compositions. In these combined modifier systems, the saturated liquid polyester conveniently comprises between 1 and 20% by weight, or more preferably 3 to 10% by weight, of the total moulding composition, whereas the thermoplastic polymer comprises 5 to 45% by weight, or more preferably 20 to 30% by weight, of the saturated liquid polyester.

The moulding composition also includes a compatible mould release agent, such as zinc stearate, or an alkyl phosphate neutralised with ethanolamine (as described and claimed in British Patent No. 1421752) The latter material is sold under the Registered Trade Mark Zelec NE. The preferred level of addition of the mould release agent is 0.2 to 2% by weight of the total weight of the moulding composition.

Fabrication of moulded articles is performed in matched metal moulds using a moulding pressure between 250 and 1000 p.s.i. and a mould temperature of 120°-160° C. Alternatively, if the moulding composition is in the form of a dough moulding compound, injection moulding can be used to produce the required articles.

After moulding, the articles are preferably washed in a suitable solvent and then coated at the surface to be metallised with a thermosetting base lacquer, whereafter said surface is metallised, preferably by a vacuum metallisation process. Preferably the metal used is aluminium, particularly where it is required to produce a reflector for a motor vehicle headlamp or fog lamp.

The invention will now be mor eparticularly described with reference to the following Examples:

EXAMPLE 1

A moulding composition having the following composition, in parts by weight, was produced:

| Polyester resin, a 60% solution in styrene of a polyester and 1 mole maleic anhydride | 21.0 |
|---|---|
| Polystyrene beads | 0.75 |
| Polypropylene adipate (Hexaplas PPA) | 3.0 |
| Azobisiso-butyronitrile | 0.15 |
| Zelec NE | 0.75 |
| Microdol Extra (finely divided chalk) | 55.35 |
| Antimony Oxiee | 4.0 |
| ¼" chopped strand glass fibres (Silenka 8082) | 15.0 |

The above constituents were mixed in a Z-blade mixer to form a homogeneous moulding composition which was then used to produce 6" diameter lamp reflector bodies using a 300 ton horizontal clamp screw injection moulding machine. The injection pressure employed was 6840 p.s.i, the holding pressure was 3420 p.s.i., and the mould temperature was 150° C. The reflectors were allowed to cure in the mould for 60 seconds.

The mounting operation described above was repeated to produce ten reflector bodies which, after removal from the mould, were each dipped in a xylene solvent and then provided with three coats of a base lacquer, preferably as supplied by the International Paint Company as H8F30/0301C8320. Each lacquer coating was produced by dipping the reflector in the lacquer and then stoving the lacquer coat at an elevated temperature before any subsequent re-dipping. After lacquering, the reflector bodies were vacuum aluminised. The resultant reflectors were then assembled into lamp units, by fitting each reflector with a glass lens and a 55 watt, 12 volt, type H1 light bulb. The light units were then operated for a period of 48 hours during which temperatures in excess of 120° C. were generated within the units. At the end of the test period, the units were dismantled and the degree of masking of the reflective coating by condensed voltatiles was assessed on a scale of 1.0 (indicating no masking of the reflective coating) to 7.0 (indicating complete masking of the reflective coating). The results were then averaged over the ten reflectors and a mean value of 2.4 was obtained.

COMPARATIVE EXAMPLE 1 the method of the above Example was repeated, but with the azobisisobutyronitrile curing initiator in the moulding composition being replaced by 0.5 parts by weight of a capryloyl peroxide initiator. In addition, the amount of finely divided chalk in the moulding composition was reduced to 55 parts by weight so as to take account of the additional initiator present. When the masking performance test was repeated on ten reflectors produced from this moulding composition, a mean value of 3.8 was obtained for the masking performance. Thus the use of a moulding composition containing a peroxy curing initiator produced a lamp reflector which was more susceptable to the problem of fogging than the reflector produced according to example 1, in which an azo compound curing initiator was employed.

EXAMPLE 2

The process of Example 1 was repeated with a moulding composition containing the following components, in parts by weight:

| Palatol P14 | 14.85 |
|---|---|
| Palatol P14HP | 9.9 |
| Azobisisobutyronitrile | 0.15 |
| Zelec NE | 0.75 |
| Microdol Extra (finely divided chalk) | 55.35 |
| Antimony Oxide | 4.0 |
| ¼" chopped strand glass fibres (Silenka 8082) | 15.0 |

Palatol is a trade name of BASF (UK) Ltd.

When subjected to the test of Example 1, the mean masking performance of ten lamp reflectors was 1.2.

COMPARATIVE EXAMPLE 2

The process of Example 2 was repeated but with the curing initiator in the moulding composition being 0.5 parts by weight of capryloyl peroxide and with the finely divided chalk content being reduced to 55 parts by weight to take account of the extra weight of curing initiator present. The mean masking performance of ten lamp reflectors produced from this composition was 3.0, again indicating increased masking with the use of a peroxy compound, instead of an azo compound, as the curing initiator.

I claim

1. A moulded reflector for a vehicle headlamp or fog lamp, said reflector having a surface and a metallic reflective coating thereon, said reflector comprising a cured unsaturated polyester resin based thermosetting moulding composition containing, as a curing initiator, an azo compound capable of forming free radicals at the moulding temperature.

2. A moulded reflector as claimed in claim 1, wherein said azo compound is selected from the group consisting of 2,2'-azobisisobutyronitrile, 2-t-butylazo-2-cyano-4methoxy-4-methylpentane, 2,-t-butylazo-2-cyanopropane, 2-t-butylazo-2-cyanobutane, 1-t-amylazo-1-cyanocyclo-hexane, 2-t-butylazo-1-cyanocyclohexane, 2-t-butylazo-2, 4-dimethoxy-4-methylpentane.

3. A moulded reflector as claimed in claim 1, wherein said azo compound is present in an amount between 0.01% and 0.5% of the total weight of the moulding composition.

4. A moulded reflector as claimed in claim 1, wherein the moulding composition also contains a fibre reinforcement in an amount between 10% and 35% of the total weight of the moulding composition.

5. A moulded reflector as claimed in claim 1, wherein the metallic reflective coating is an aluminum layer.

* * * * *